: US 7,916,003 B2
(45) Date of Patent: *Mar. 29, 2011

(12) United States Patent
Ramirez, Jr.

(54) PROTECTIVE COVER ASSEMBLY

(75) Inventor: Roy Ramirez, Jr., Oklahoma City, OK (US)

(73) Assignee: Hard 2 Top Products, Inc., Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/190,417

(22) Filed: Aug. 12, 2008

(65) Prior Publication Data
US 2008/0297329 A1 Dec. 4, 2008

Related U.S. Application Data

(63) Continuation of application No. 11/234,984, filed on Sep. 26, 2005, now Pat. No. 7,411,483, which is a continuation of application No. 10/624,587, filed on Jul. 22, 2003, now Pat. No. 6,950,012, which is a continuation of application No. 09/843,416, filed on Apr. 26, 2001, now Pat. No. 6,597,283.

(60) Provisional application No. 60/201,141, filed on May 2, 2000.

(51) Int. Cl.
*B60R 25/10* (2006.01)
(52) U.S. Cl. ...... 340/426.1; 340/540; 340/541; 340/545.6; 340/550; 340/686.1; 340/687; 296/95.1; 100/186

(58) Field of Classification Search ........ 340/426.1, 340/540, 541, 545.6, 550, 686.1, 687; 296/136, 296/95.1; 100/186
See application file for complete search history.

(56) References Cited

U.S. PATENT DOCUMENTS

| | | | | |
|---|---|---|---|---|
| 5,770,530 | A | * | 6/1998 | Nockemann et al. ........ 442/319 |
| 6,302,471 | B1 | * | 10/2001 | Windpassinger et al. ........ 296/107.11 |
| 6,597,283 | B2 | * | 7/2003 | Ramirez, Jr. ........ 340/426.1 |
| 6,818,279 | B2 | * | 11/2004 | Schonenbach et al. ........ 428/156 |
| 7,411,483 | B2 | * | 8/2008 | Ramirez, Jr. ........ 340/426.1 |

\* cited by examiner

*Primary Examiner* — Daryl Pope
(74) *Attorney, Agent, or Firm* — Dunlap Codding, P.C.

(57) ABSTRACT

A protective cover assembly is provided. The protective cover assembly includes a flexible cover and an alarm assembly. The flexible cover includes an outer layer of flexible material, an inner layer of flexible material, and at least one layer of tear resistant material positioned between the outer and inner layers. The alarm assembly includes a pair of conductor plates positioned between the outer layer of flexible material and the inner layer of flexible material, a power source, and an alarm system electrically connected to the power source and at least one of the first and second conductor plates such that upon an electrical conducting implement piercing the first conductor plate and contacting the second conductor plate an electrical connection is established between the first conductor plate and the second conductor plate thereby causing the alarm system to emit an alerting signal.

5 Claims, 3 Drawing Sheets

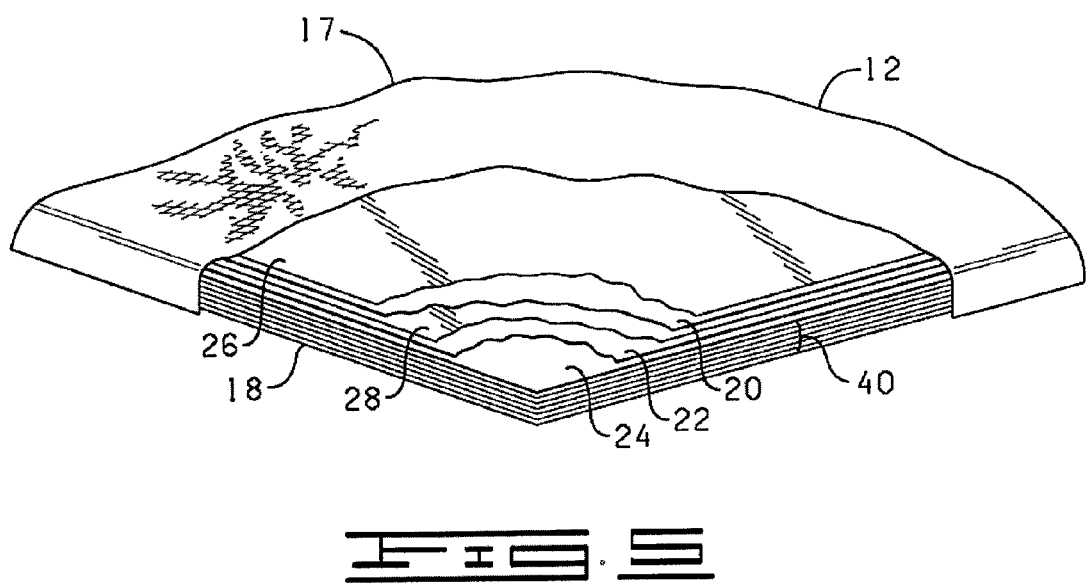

PROTECTIVE COVER ASSEMBLY

CROSS REFERENCE TO RELATED APPLICATIONS

This application is a continuation of U.S. Ser. No. 11/234,984, filed Sep. 26, 2005, now U.S. Pat. No. 7,411,483, which is a continuation of U.S. Ser. No. 10/624,587, filed Jul. 22, 2003, now U.S. Pat. No. 6,950,012, which is a continuation of U.S. Ser. No. 09/843,416, filed Apr. 26, 2001, now U.S. Pat. No. 6,597,283, which claims the benefit of U.S. Provisional Ser. No. 60/201,141, filed May 2, 2000, each of which is hereby incorporated herein by reference.

BACKGROUND OF THE INVENTION

1. Field of the Invention

This invention generally relates to protective covers, and more particularly, but not by way of limitation, to a penetration and tear resistant protective cover assembly with an alarm system incorporated therein.

2. Brief Description of Related Art

Convertible cars, pick up truck beds, motorcycles, boats, all terrain vehicles, wet bikes, lawn tractors and other vehicles of all sorts are easy prey to vandals and thieves. Soft covers designed for such vehicles can be quickly and easily cut with a knife or other sharp object thereby allowing unauthorized entry into the vehicle. Perimeter alarm systems have been utilized in an attempt to protect such vehicles, but even perimeter alarm systems do not offer sufficient deterrence to discourage vandals and thieves. In addition, perimeter alarm systems tend to be erratic in dependability and performance, are often set off by wind gusts, accidental bumping or heavy vibrations, and are susceptible to being rendered inoperable by disconnection of the power supply or by power supply malfunction.

To this end, a need exists for a protective cover assembly that is tear resistant to prevent unauthorized entry through a soft cover and capable of signaling an attempt of an unauthorized entry. It is to such a protective cover assembly that the present invention is directed.

SUMMARY OF THE INVENTION

The present invention is directed to a protective cover assembly which is particularly well suited for use as a convertible top. The protective cover assembly includes a flexible cover and an alarm assembly. The flexible cover includes an outer layer of flexible material, an inner layer of flexible material, and at least one layer of tear resistant material interposed between the outer and inner layers. The alarm assembly includes a pair of conductor plates interposed between the outer layer of flexible material and the inner layer of flexible material, a power source, and an alarm system electrically connected to the power source and at least one of the first and second conductor plates such that upon an electrical conducting implement piercing the first conductor plate and contacting the second conductor plate an electrical connection is established between the first conductor plate and the second conductor plate thereby causing the alarm system to emit an alerting signal.

Other advantages and features of the present invention will be apparent from the following description and drawings.

DESCRIPTION OF THE SEVERAL VIEWS OF THE DRAWINGS

FIG. 5 is a partial cutaway, prospective view of another embodiment of a protective cover assembly.

DETAILED DESCRIPTION OF THE INVENTION

Figure 1:
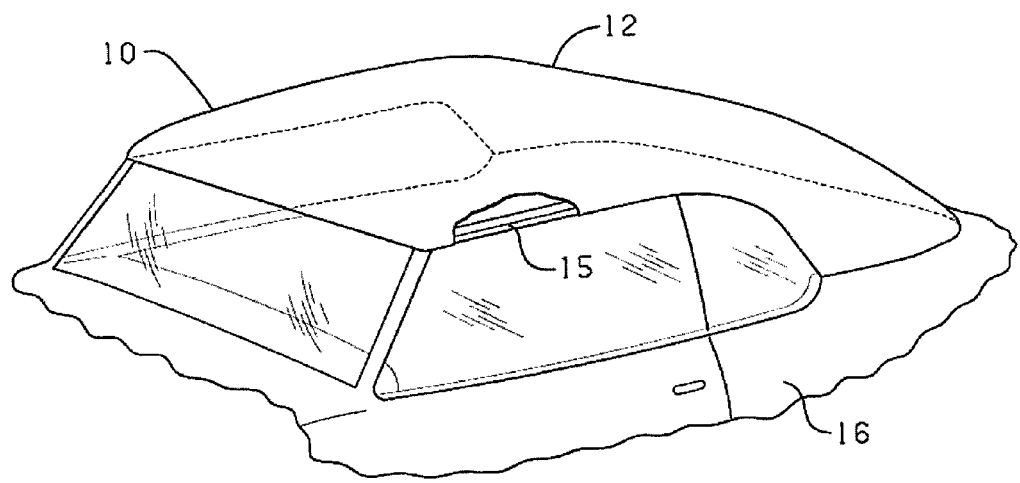
FIG. 1 is a partially cut away, perspective view of a protective cover assembly constructed in accordance with the present invention shown being used as a convertible car top.
Figure 2:
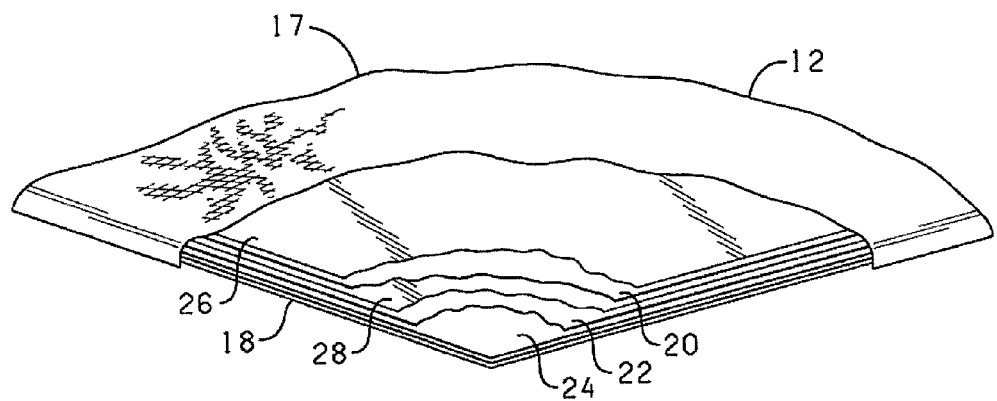
FIG. 2 is a partial cut away, perspective view of the protective cover assembly of FIG. 1.
Figure 3:
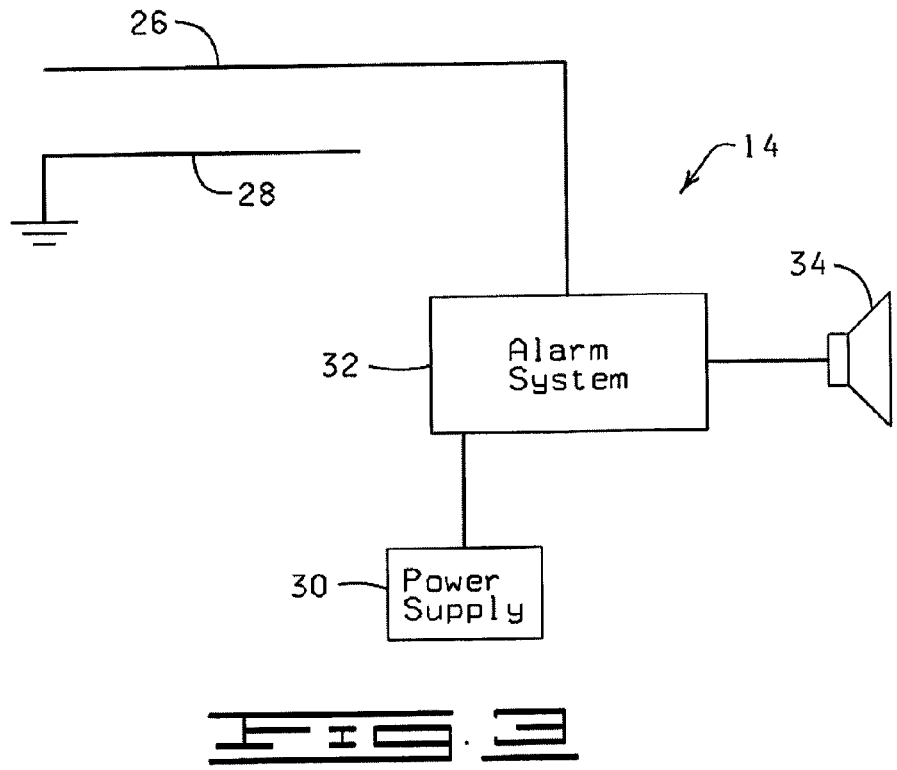
FIG. 3 is a schematic diagram of an electrical circuit utilized in the present invention.

Referring now to the drawings, and more particularly to FIGS. 1-3, shown therein is a protective cover assembly 10 constructed in accordance with the present invention. The protective cover assembly 10 includes a tear resistant cover 12 (FIGS. 1 and 2) and an alarm assembly 14 (FIG. 3). The protective cover assembly 10 is particularly well suited for used as a convertible car top, as shown in FIG. 1. The protective cover assembly 10 is shown mounted to an articulating frame 15 of a convertible vehicle 16 in a conventional manner. It will be appreciated that articulating frames are well known in the art. Thus, no further description of their components, construction, or operation is believed necessary for one skilled in the art to understand and implement the protective cover assembly 10 of the present invention.

The tear resistant cover 12 is shown in FIG. 2 to include an outer layer of material 17 and an inner layer of material 18. The outer and inner layers of material 17 and 18 may be fabricated from any flexible material ordinarily utilized in the construction of conventional convertible car tops, such as vinyl and canvas, so that the tear resistant cover 12 has the appearance of a conventional convertible top.

The tear resistant cover 12 further includes at least one layer of flexible, tear resistant material interposed between the outer layer of material 17 and the inner layer of material 18. The flexible, tear resistant material can be fabricated from any flexible, lightweight material having a high tensile strength and a high cut resistance. A suitable tear resistant material may be fabricated of a manmade, organic fiber sold under the trademark "KEVLAR" by E.I. Dupont de Nemours & Co., Inc.

More particularly, the tear resistant cover 12 is illustrated in FIG. 2 as including a first layer of tear resistant material 20, a second layer of tear resistant material 22, and a third layer of tear resistant material 24. To increase penetration resistance of the tear resistant cover 12, the pattern of fabric weave of the first layer of tear resistant material 20 is preferably rotated approximately ninety degrees relative to the pattern of fabric weave of the second layer of tear resistant material 22. Likewise, the pattern of fabric weave of the third layer of tear resistant material 24 is preferably rotated approximately ninety degrees relative to the pattern of fabric weave of the second layer of tear resistant material 22. It will be appreciated that the tear resistant cover 12 may be sized, shaped, formed, adapted or molded into any configuration necessary to adequately attached to, cover, and protect the desired vehicle or article.

As shown in FIG. 3, the alarm assembly 14 of the protective cover assembly 10 includes a first conductor plate 26, a second conductor plate 28, a power supply 30, and an alarm system 32 which includes an alerting signal emitter, such as a speaker 34. The alarm system 32 can be any conventional alarm system used for automobiles. When the protective cover assembly 10 is used as a convertible top or another type of covering for a vehicle, the power supply 30 can be the vehicle's battery or generator or combination thereof.

Figure 4:
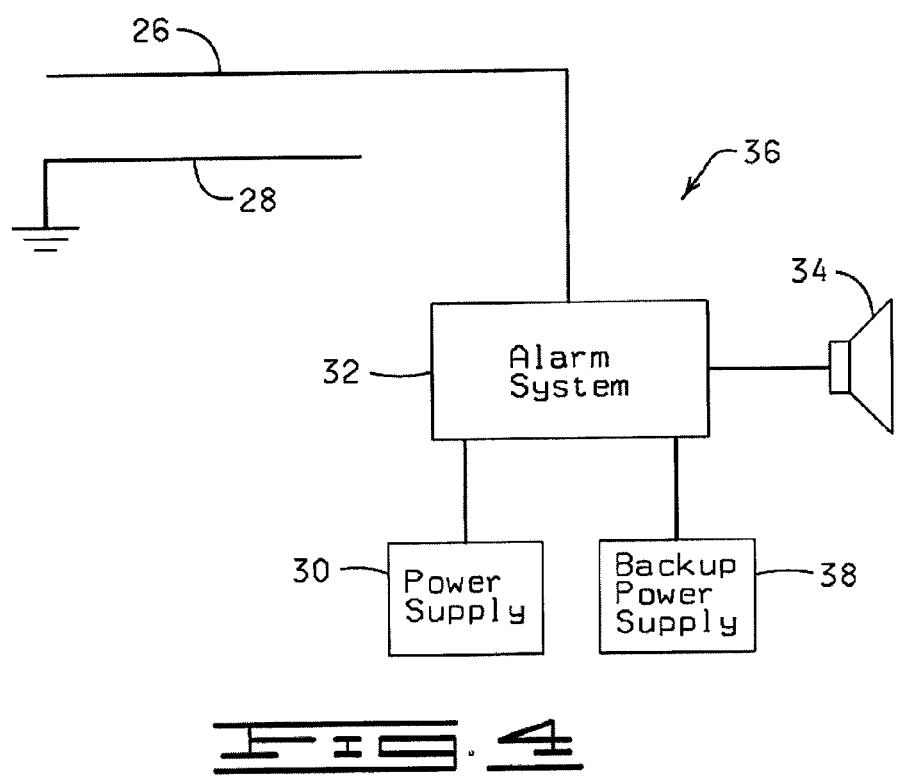
FIG. 4 is a schematic diagram of another version of an electrical circuit which can be utilized in the present invention.

FIG. 4 illustrates another embodiment of an alarm system 36 which is similar to the alarm assembly 14, except that the alarm system 36 is equipped with a backup power supply 38, such as a 12 volt battery, to provide an element of redundancy in the event of disconnection or malfunction of the main power supply 30. It should be noted that the backup power supply 38 may be located anywhere appropriate within the engine compartment or even within the passenger compartment of the vehicle, thereby making it difficult for a would-be thief or vandal to disable the protective cover assembly 10.

Each of the first and second conductor plates 26 and 28 of the alarm assembly 14 is fabricated of a sheet of flexible, electric conducting material, such as aluminum foil or copper. To increase the durability of the first and second conductor plates 26 and 28 to insure that the first and second conductor plates 26 and 28 are sufficiently durable to withstand repeated folding and unfolding from the opening and closing of the convertible top, each of the first and second conductor plates 26 and 28 is coated with a protective film. A suitable protective film is sold under the trademark "MYLAR" by E.I. Dupont de Nemours & Co., Inc. A suitable material for use as the first and second conductor plates 26 and 28 is commercially available from Arlon Engineered Laminates and Coating, 199 Amaral Street, East Providence, R.I.

The first and second conductor plates 26 and 28 are sized, shaped, adapted, formed or molded to substantially correspond to the size and shape of the outer and inner layers of material 17 and 18 and the first, second and third layers of tear resistance material 20, 22 and 24. The first and second conductor plates 26 and 28 are preferably assembled with one of the first, second, or third sheets of tear resistance material 20, 22, and 24 positioned between the first and second conductor plates 26 and 28 so as to electrically insulate the first conductor plate 26 from the second conductor plate 28. However, the protective film of the first and second conductor plates 26 and 28 can be utilized as an insulator which allows the first and second conductor plates 26 and 28 to be positioned adjacent to each other at low voltage levels without electrically shorting. It will also be appreciated that any other suitable insulating material can be used to electrically insulate the first conductor plate 26 from the second conductor plate 28.

With the first and second conductor plates 26 and 28 incorporated into the tear resistant cover 12, the first conductor plate 26 is electrically isolated from ground and electrically connected to the alarm system 32, while the second conductor plate 28 is electrically grounded. The first and second conductor plates 26 and 28 are electrically insulated such that upon an electrical conducting implement, such as a knife or screwdriver, piercing the outer layer of material 17, the first conductor plate 26, and the first layer of tear resistant material 20, and contacting the second conductor plate 28, an electrical connection is established between the first conductor plate 26 and the second conductor plate 28 thereby causing the alarm system 32 to emit an alerting signal via the speaker 34.

Thus, if an unauthorized entry is attempted by cutting the protective cover assembly 10, the person attempting such entry will discover that the protective cover assembly 10 is difficult to penetrate with any sharp object, almost impossible to tear or cut, and the alarm system 32 will sound. If the would be thief attempts to disconnect the power supply 30 in an attempt to disable the alarm assembly 32 it will be to no avail because the protective cover assembly 10 can also include the backup power supply 38. Furthermore, because the first conductor plate 26 is connected to the positive terminal of the power supply 30, if the thief is electrically grounded, the alarm system 32 will emit an alerting signal when the implement contacts the first conductor plate 26 without the necessity of contacting the second conductor plate 28.

While the protective cover assembly 10 has been described above as having two layers of conducting plates 26 and 28 and three layers of tear resistant material 20, 22 and 24 those skilled of the art will readily recognize that additional layers of tear resistant material can be removed or added to the protective cover assembly 10 to alter its resistance to tear. For example, as illustrated in FIG. 5, a sufficient number of layers of tear resistant material can be added to make the tear resistant cover 12 substantially bullet resistant. These additional layers are identified by the reference numeral 40 in FIG. 5. Those skilled of the art will also readily recognize that a protective cover assembly can be constructed that includes the tear resistant properties discussed above, but does not include the alarm assembly 14. Similarly, a protective cover assembly can be constructed that includes the alarm assembly, but which is not tear resistant. Additionally, those skilled in the art will readily recognize that while the protective cover assembly 10 has been described for use as a top for a convertible automobile, the protective cover assembly 10 can readily be sized, shaped, adapted into a variety of different sizes and shapes for use as a cover for a variety of different devices, apparatus and appliances, such as, boats, tents, pickup truck beds, door openings, and window openings.

From the above description, it is clear that the present invention is well adapted to carry out the objects and to attain the advantages mentioned herein as well as those inherent in the invention. While a presently preferred embodiment of the invention has been described for purposes of this disclosure, it will be readily understood that numerous changes may be made which will readily suggest themselves to those skilled in the art and which are accomplished within the spirit of the invention disclosed.

What is claimed:

1. A cover assembly, comprising:

a first conductor plate;

a second conductor plate electrically insulated from the first conductor plate;

a power source; and an alarm system electrically connected to the power source and at least one of the first conductor plate and the second conductor plate such that upon an electrical conducting implement piercing the first conductor plate and contacting the second conductor plate an electrical connection is established between the first conductor plate and the second conductor plate thereby causing the alarm system to emit an alerting signal.

2. A cover assembly, comprising:

a first conductor plate fabricated of a flexible material; and a second conductor plate fabricated of a flexible material, electrically insulated from the first conductor plate, wherein at least one of the first conductor plate and the second conductor plate is electrically connectable to a power source and an alarm system such that upon an electrical conducting implement piercing the first conductor plate and contacting the second conductor plate an electrical connection is established between the first conductor plate and the second conductor plate thereby causing the alarm system to emit an alerting signal.

3. A cover assembly for a vehicle, comprising:
a first conductor plate fabricated of a flexible material;
a second conductor plate fabricated of a flexible material, electrically insulated from the first conductor plate; and
at least one layer of flexible, tear resistant material positioned between the first conductor plate and the second conductor plate,
wherein at least one of the first conductor plate and the second conductor plate is electrically connectable to a power source and an alarm system such that upon an electrical conducting implement piercing the first conductor plate and contacting the second conductor plate an electrical connection is established between the first conductor plate and the second conductor plate thereby causing the alarm system to emit an alerting signal.

4. The cover assembly of claim 3 further comprising:
a plurality of layers of flexible, tear resistant material positioned between the first conductor plate and the second conductor plate.

5. The cover assembly of claim 4 wherein each layer of flexible, tear resistant material has a fabric pattern weave and wherein the fabric pattern weave of each layer of flexible, tear resistant material is oriented approximately ninety degrees relative to an adjacent layer of flexible, tear resistant material.

* * * * *